United States Patent Office

Re. 24,412
Reissued Dec. 31, 1957

24,412

BLEACHING, STERILIZING, DISINFECTING, AND DETERGING COMPOSITIONS

Edgar E. Hardy, New Martinsville, W. Va., assignor to Monsanto Chemical Company, St. Louis, Mo., a corporation of Delaware No Drawing. Original No. 2,607,738, dated August 19, 1952, Serial No. 35,297, June 25, 1948. Application for reissue November 28, 1955, Serial No. 549,585

18 Claims. (Cl. 252—99)

Matter enclosed in heavy brackets [ ] appears in the original patent but forms no part of this reissue specification; matter printed in italics indicates the additions made by reissue.

The present invention relates to bleaching, sterilizing, disinfectant and detergent compositions containing as the active constituent trichlorocyanuric acid.

An object of the invention is to provide compositions containing trichlorocyanuric acid in combination with alkaline salts, particularly alkaline phosphates, which are stable under ordinary conditions of storage and transportation and which, when dissolved in water, yield solutions suitable for bleaching, sterilizing and disinfecting.

Another object of the invention is to provide a disinfecting detergent for use in cleaning of containers, particularly metal cans used in the bulk transport of milk, cream and other milk products.

An additional object of the invention is to provide a detergent for use in hospitals or similar institutions, as well as in hotels and restaurants for dishwashing and other purposes.

A further object is to provide a novel composition of matter which is a highly efficient denture cleanser.

Other objects and advantages of the invetion will be apparent to those skilled in the art as the description proceeds.

To the accomplishment of the foregoing and related ends, the invention comprises the features hereinafter disclosed, and particularly pointed out in the claims, the following description setting forth in some detail some of the various forms in which the princple of the invention may be applied.

In accordance with the present invention, novel compositions of matter having oxidizing, bleaching, detergent and disinfecting properties are prepared by intimately and uniformly mixing together in the substantially dry state trichlorocyanuric acid and alkaline salts such as sodium carbonate, sodium borate, sodium silicate, trisodium phosphate, tetrasodium pyrophosphate, sodium triphosphate or mixtures of these. In addition to the these two basic ingredients, wetting agents, synthetic detergents generally, soaps, fillers, abrasives and water softening agents of the inorganic or organic type may be incorporated in the composition to impart special properties.

The proportions of the several ingredients may be varied over a wide range depending upon the available chlorine desired and also the application involved. For example, trichlorocyanuric acid may be employed in amounts as low as a fraction of one percent in the preparation of general surgical antiseptics and as high as ninety percent or more when a powerful bleaching agent is desired. The other ingredients may be varied over an equally broad range and thus may constitute a major or minor proportion of the final composition depending upon its ultimate use.

The new compositions are characterized by a high degree of stability when dry and may be stored for long periods of time and/or transported over considerable distances without substantial decomposition. When dissolved in water, the ingredients of the mixture apparently react together to yield hypochlorite chlorine which is responsible for its efficient oxidizing, bleaching, disinfecting and sterilizing action.

The new compositions are preferably compounded and marketed as dry powders containing the various ingredients intimately and homogeneously blended together so that a definite weight of material may be used to provide a solution of definite concentration. It is also within the scope of the present invention to supply these mixtures in the form of tablets, sticks, cubes or agglomerates.

For a more complete understanding of the present invention, reference is made to the following illustrative examples.

EXAMPLE I 8.5 parts of trichlorocyanuric acid (42.2% Cl), 20 parts of sodium silicate powder (3.2 $SiO_2.Na_2O$), 40 parts of trisodium phosphate and 31.5 parts of sodium carbonate are intimately and uniformly blended together to provide a dry stable mixture containing about 3.5% by weight of active chlorine. This composition is adapted for use as a disinfecting detergent for cleaning containers, particularly metal cans used in the storage and transport of milk, cream and other dairy products.

EXAMPLE II 8.5 parts of trichlorocyanuric acid (42.2% Cl), 40 parts of tetrasodium pyrophosphate, 15 parts of sodium silicate powder (3.2 $SiO_2.Na_2O$), 30 parts of sodium sesquicarbonate and 6.5 parts of sodium dodecylbenzene sulfonate are mixed together to provide a dry stable free flowing disinfecting detergent. This product is eminently suitable for use in hospitals as well as hotels and restaurants for dishwashing and other purposes and in the beverage, food and dairy industries for washing and sterilizing bottles and containers of various types.

EXAMPLE III

The following materials, when mixed together in the proportions indicated, provide a dry stable composition which serves as a highly effective denture cleanser.

| | Percent |
|---|---|
| Trichlorocyanuric acid (42.2% Cl) | 1.0 |
| Sodium lauryl sulfate | 5.0 |
| Trisodium hydrogen pyrophosphate | 94.0 |

EXAMPLE IV 9.52 parts of trichlorocyanuric acid, 41.98 parts of trisodium phosphate and 2.5 parts of starch or other suitable binder are uniformly blended together to form a dry stable mixture which is then pressed into cubes suitable for use as a household bleach.

As hereinbefore indicated, the proportions of the various ingredients of the compositions of the present invention may be varied widely, but in general highly satisfactory results are obtainable with from about 0.5% to about 40% by weight of trichlorocyanuric acid. However, it is preferred to use this material in an amount corresponding to about 1% to about 26% by weight, or stated differently, in an amount supplying from about 0.4% to about 10.5% by weight of active chlorine.

The salts employed in compounding the new compositions are alkaline salts such as alkali metal [and ammonium] carbonates, phosphates, borates or silicates, etc. which salts are used in such amounts as will give to the final solution the desired pH. Thus, the proportions of these materials are not critical but may fluctuate between wide limits depending upon the ultimate use of the composition.

The wetting agents and/or synthetic detergents which are used in making the new compositions are sulfonated products such as sulfonated hydrocarbons, sulfated higher alcohols and sulfonated oils. Illustrative examples of these are sodium salts of long chain alkyl sulfates such as sodium lauryl sulfate, sodium octadecyl sulfate and sodium oleyl sulfate; sodium salts of alkyl naphthalene sulfonic acids available commercially under the name: Nekals, Perminals, Merpentine, Alkanol B, Oranit, Neomerpin, Erkalin and Alkanol SA; sodium salts of sulfonated abietenes such as sodium abietene sulfonate; sodium salts of amide sulfonates such as Igepon T ($C_{17}H_{33}CON—C_2H_4SO_3Na$); sodium salts of alkylated benzene sulfonic acids, in which the alkyl group contains not less than 8 and not more than 18 carbon atoms, especially the decyl, dodecyl and tetradecyl benzene sulfonic acids; the sodium salts of the alkyl esters of sulfobenzoic or salicylic acid, in which the alkyl group may be either octyl, decyl, dodecyl, tetradecyl, hexadecyl or octadecyl or mixtures thereof (Lorol); sodium salts of sulfonated mineral oils such as Petrosol and Petromor; sodium salts of sulfosuccinic esters such as sodium dioctylsulfosuccinate marketed under the name Aerosol OT; and Turkey red oil. In place of the sodium salts of the above wetting agents, the corresponding potassium salts may be used as well as [the amine and] other well known water soluble salts thereof. Of all the wetting agents listed above, sodium dodecyl benzene sulfonate is preferred.

The amount of wetting agent and/or synthetic detergent used may be varied widely, but in general from about 1% to 10% by weight yields satisfactory results. However, larger or smaller proportions may be used as desired.

Trichlorocyanuric acid is prepared by dissolving cyanuric acid in the theoretical quantity of a 5% solution of caustic potash or soda and treating the resulting solution with chlorine until three atoms of the alkali have been substituted by chlorine in accordance with the following equation:

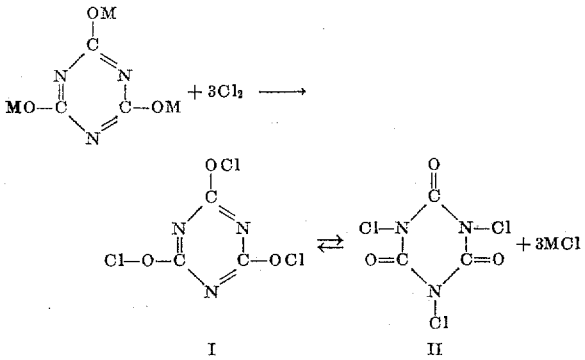

I II wherein M represents sodium or potassium.

In view of the above equation, it is evident that trichlorocyanuric acid exists in two tautomeric forms and on the basis of theoretical considerations, it is believed that form I predominates over form II. In any event for the purposes of the present specification, it is to be understood that either one or both forms are contemplated.

It should be understood that the present invention is not limited to the specific compositions hereinbefore disclosed, but that it embraces all equivalent compositions coming within the scope of the appended claims.

What I claim is:

1. A substantially dry stable composition of matter consisting essentially of trichlorocyanuric acid, and a water soluble alkaline compound selected from the group consisting of alakali metal [and ammonium] salts, said trichlorocyanuric acid being employed in an amount varying from 0.5% to 90% by weight.

2. A substantially dry stable composition of matter consisting essentially of trichlorocyanuric acid and trisodium phosphate, said trichlorocyanuric acid being employed in an amount varying from 0.5% to 90% by weight.

3. A substantially dry stable composition of matter consisting essentially of trichlorocyanuric acid and tetrasodium pyrophosphate, said trichlorocyanuric acid being employed in an amount varying from 0.5% to 90% by weight.

4. A substantially dry stable composition of matter consisting essentially of trichlorocyanuric acid and sodium triphosphate, said trichlorocyanuric acid being employed in an amount varying from 0.5% to 90% by weight.

5. A substantially dry stable composition of matter suitable for oxidizing, bleaching, disinfecting, sterilizing and similar purposes, said composition consistng essentially of an intimate mixture of from about 1% to about 26% by weight of trichlorocyanuric acid and a dry water soluble alkaline compound selected from the group consisting of alkali metal [and ammonium] salts.

6. A substantially dry stable composition of matter consisting essentially of trichlorocyanuric acid and trisodium phosphate, said composition, when treated with water, yielding a solution having oxidizing, bleaching, disinfecting, sterilizing and similar properties, said trichlorocyanuric acid being used in an amount supplying from about 0.4% to about 10.5% by weight of active chlorine.

7. A substantially dry stable composition of matter consisting essentially of trichlorocyanuric acid and tetrasodium pyrophosphate, said composition, when treated with water, yielding a solution having oxidizing, bleaching, disinfecting, sterilizing and similar properties, said trichlorocyanuric acid being used in an amount supplying from about 0.4% to about 10.5% by weight of active chlorine.

8. A substantially dry stable composition of matter consisting essentially of trichlorocyanuric acid and sodium triphosphate, said composition, when treated with water, yielding a solution having oxidizing, bleaching, disinfecting, sterilizing and similar properties, said trichlorocyanuric acid being used in an amount supplying from about 0.4% to about 10.5% by weight of active chlorine.

9. A substantially dry stable composition of matter consisting essentially of trichlorocyanuric acid, a wetting agent selected from the group consisting of sulfonated and sulfated organic compounds and a water soluble alkaline compound selected from the group consisting of alkali metal [and ammonium] salts, said trichlorocyanuric acid being employed in amount varying from about 1% to about 26% by weight.

10. A substantially dry stable composition of matter consisting essentially of trichlorocyanuric acid, sodium dodecyl benzene sulfonate and trisodium phosphate, said trichlorocyanuric acid being employed in an amount varying from about 1% to about 26% by weight.

11. A substantially dry stable composition of matter consisting essentially of trichlorocyanuric acid, sodium lauryl sulfate and tetrasodium pyrophosphate, said trichlorocyanuric acid being employed in an amount varying from about 1% to about 26% by weight.

12. A substantially dry stable composition of matter consisting essentially of trichlorocyanuric acid, sodium dodecyl sulfobenzoate and sodium triphosphate, said trichlorocyanuric acid being employed in an amount varying from about 1% to about 26% by weight.

*13. In the process of bleaching, sterilizing and disinfecting with an aqueous solution of hypochlorite chlorine, the improvement which comprises producing said hypochlorite chlorine by dissolving in water the composition of claim 1.*

*14. In the process of bleaching, sterilizing and disinfecting with an aqueous solution of hypochlorite chlorine,*

*the improvement which comprises producing said hypochlorite chlorine by dissolving in water the composition of claim 4.*

*15. In the process of bleaching, sterilizing and disinfecting with an aqueous solution of hypochlorite chlorine, the improvement which comprises producing said hypochlorite chlorine by dissolving in water the composition of claim 5.*

*16. In the process of bleaching, sterilizing and disinfecting with an aqueous solution of hypochlorite chlorine, the improvement which comprises producing said hypochlorite chlorine by dissolving in water the composition of claim 7.*

*17. In the process of bleaching, sterilizing and disinfecting with an aqueous solution of hypochlorite chlorine,*

*the improvement which comprises producing said hypochlorite chlorine by dissolving in water the composition of claim 8.*

*18. In the process of bleaching, sterilizing and disinfecting with an aqueous solution of hypochlorite chlorine, the improvement which comprises producing said hypochlorite chlorine by dissolving in water the composition of claim 9.*

References Cited in the file of this patent or the original patent

UNITED STATES PATENTS

| | | |
|---|---|---|
| 2,184,886 | Muskat et al. | Dec. 26, 1939 |
| 2,263,948 | Halvorson et al. | Nov. 25, 1941 |
| 2,415,657 | Riggs et el. | Feb. 11. 1947 |